(12) United States Patent
Javerlhac

(10) Patent No.: US 6,499,543 B1
(45) Date of Patent: Dec. 31, 2002

(54) TILLING IMPLEMENT COMPRISING A PLURALITY OF GANGS OF DISKS ROTATING ABOUT A COMMON AXIS

(76) Inventor: Jean-Charles Javerlhac, Les Rosiers, 16300 Barbezieux (FR)

( * ) Notice: Subject to any disclaimer, the term of this patent is extended or adjusted under 35 U.S.C. 154(b) by 0 days.

(21) Appl. No.: 09/743,858

(22) PCT Filed: Jul. 21, 1999

(86) PCT No.: PCT/FR99/01789

§ 371 (c)(1),
(2), (4) Date: Feb. 15, 2001

(87) PCT Pub. No.: WO00/04755

PCT Pub. Date: Feb. 3, 2000

(30) Foreign Application Priority Data

Jul. 21, 1998 (EP) .............................. 98401859

(51) Int. Cl.⁷ .......................... A01B 23/00; A01B 21/08
(52) U.S. Cl. ...................... 172/178; 172/187
(58) Field of Search ................ 172/177, 178, 172/185, 186, 187, 201, 440, 441, 451, 583, 587, 599, 594–596, 618, 640, 657, 696

(56) References Cited

U.S. PATENT DOCUMENTS

| 1,639,104 | A |   | 8/1927  | Paul |
|-----------|---|---|---------|------|
| 2,178,052 | A |   | 10/1939 | Smith |
| 3,047,075 | A | * | 7/1962  | Frank .......................... 172/187 |
| 3,734,199 | A |   | 5/1973  | Tsuchiya et al. |
| 4,211,284 | A | * | 7/1980  | Collado ....................... 172/187 |
| 4,291,770 | A |   | 9/1981  | Engler |
| 5,082,064 | A |   | 1/1992  | Landoll et al. |

FOREIGN PATENT DOCUMENTS

| DE | 976 328    | 6/1963  |
| FR | 469 733    | 8/1914  |
| FR | 2 666 484  | 3/1992  |
| WO | WO 90/13218 | 11/1990 |

* cited by examiner

Primary Examiner—Robert E. Pezzuto
(74) Attorney, Agent, or Firm—Oliff & Berridge, PLC

(57) ABSTRACT

The invention relates to a tilling implement of the type comprising at the front at least two gangs of disks (1, 2) whose mutually-parallel axes are inclined relative to a direction perpendicular to the direction of advance (F) of the tilling implement, and at the rear at least one gang of disks on an axis which is inclined in the opposite direction to that of the front gangs (1, 2). The disks (3) of the front gangs are multi-lobed disks, the disks of the rear gang(s) being multi-lobed disks or multi-blade or multi-flail disks. The disks in any one gang are equidistant and the disks in a given gang are situated, when seen in the advance direction of the implement, between the disks of the preceding gang so as to pass between their tracks.

18 Claims, 3 Drawing Sheets

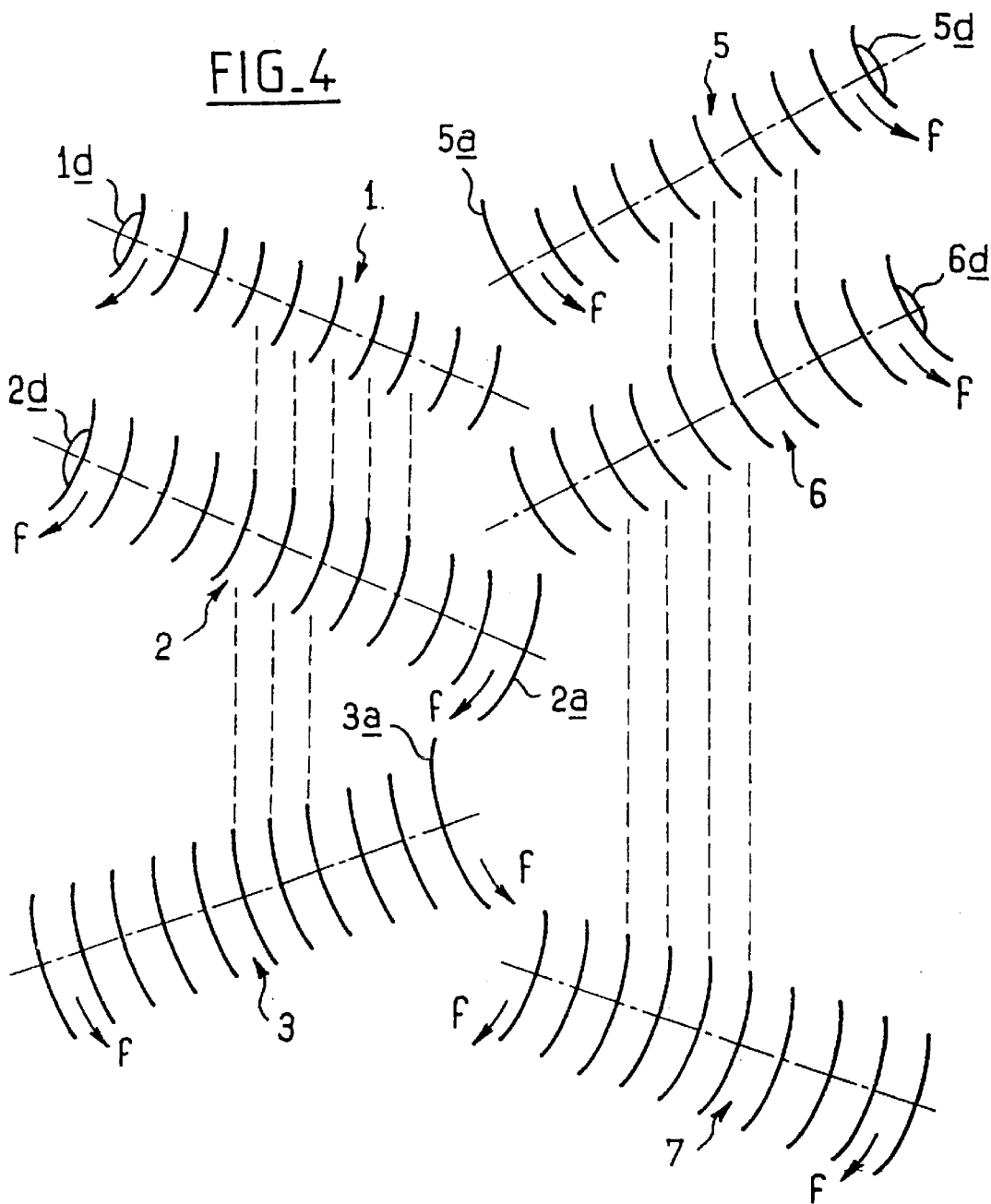
FIG_4
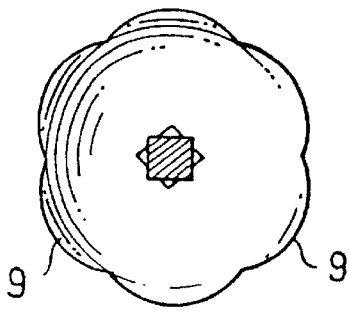
FIG_5
FIG_6
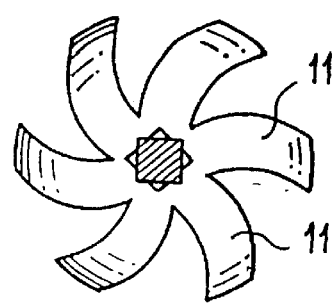
FIG_7

TILLING IMPLEMENT COMPRISING A PLURALITY OF GANGS OF DISKS ROTATING ABOUT A COMMON AXIS

The present invention relates to a novel disk tilling implement of the type comprising a plurality of gangs of disks, the disks in each gang rotating about a common axis.

BACKGROUND OF THE INVENTION

Tilling implements are already known that comprise gangs of common axis disks, which gangs are put into rotation independently of one another or together when they are moved in the tilling direction while bearing against the ground at the same time as they move or turn over the earth.

In particular, Redares' French patent No. 2 666 484 discloses a stubble-burying implement having two inclined parallel rows of disks in the form of spherical caps situated at the front and a third row of disks of the same shape situated at the rear of the implement and inclined in a direction opposite to that of the first two rows.

Such an implement serves to chop up and mix stubble with earth over a shallow depth using the two rows of concave disks situated at the front, while the row of larger diameter concave disks situated at the rear serves to bury the stubble in the ground.

By virtue of its structure and its purpose (breaking up and burying stubble) such an implement cannot be considered as a genuine tilling implement which needs to work the ground to a greater depth in a manner that is uniform while ensuring that a plane and continuous surface is not formed to mark the boundary between a surface portion of the ground which has been tilled and the deeper portion of the ground which has not.

In general, such implements present the drawback of creating buildups or shortages of earth at the ends of the rows of disks because during tilling the earth is moved laterally relative to the axis of the implement.

Tilling implements are also known which comprise two gangs of disks placed side by side but presenting the drawback of working the earth poorly in the zone situated at the ends of the two gangs of disks which are close together.

Various types of disk are also known for mounting on tilling implements which are substantially in the form of spherical caps with peripheries that can present a series of shallow notches, of concave lobes, or of deep notches giving the disks the appearance of a multi-bladed propeller.

OBJECTS AND SUMMARY OF THE INVENTION

The present invention provides a novel tilling implement which uses simple and effective means to avoid the above drawbacks.

In its simplest embodiment, the present invention provides a tilling implement of the type comprising at the front at least two gangs of disks whose axes are parallel to each other and inclined relative to a direction perpendicular to the direction of advance of the tilling implement, and at the rear at least one gang of disks whose axis is inclined in a direction opposite to that of the front gangs, said tilling implement being characterized by the facts: that the disks of the front gangs are multi-lobed disks; that the disks of the rear gang(s) are multi-lobed disks or disks in the form of multiple blades or flails; that the disks in any one gang are equidistant; and that the disks of any given gang are situated, when seen in the direction of advance of the implement, between the disks of the preceding gang so as to pass between their tracks.

In a preferred embodiment of the invention, the disks of a gang are of a diameter that increases with increasing number of gangs of disks ahead of said gang on the implement.

In accordance with the invention, it can be advantageous to enable the gangs of disks which are at the front to rest freely on the ground, being free to move in the vertical direction relative to the frame of the tilling implement, whereas the gangs of disks situated at the rear are held in a position that is fixed relative to the tilling implement, thereby constraining them to work at a determined height relative to the ground.

In the invention, when the disks of the group of gangs which are situated at the front are in the form of spherical caps with edges cut out in the form of slightly rounded lobes, it is advantageous for the disks of the gang situated behind said group to be constituted by spherical caps which present deep notches so as to form multiple blades or flails in the disks.

It can be advantageous to place a disk of larger diameter at the rear end of a gang of disks situated at the front and at the front end of the gang of disks situated at the rear, thus making it possible to have a tilled surface that is more plane.

Similarly, in accordance with the invention, it can be advantageous to place a few disks of decreasing diameter at the front end of a gang of disks situated at the front and at the rear end of a gang of disks situated at the rear so as to decrease the amount of tilling work performed at said ends.

Because, in accordance with the invention, the disks of a gang of disks are situated between two disks of the preceding gang of disks when seen in the forward direction (each disk performs its work between the traces of the two disks that precede it), the invention makes it possible to perform work uniformly over the entire tilled surface and avoids forming furrows of the kind that are usually formed with presently known tilling implements of this type.

This result is further improved if the disks in the same gang are fixed helically on their common axis, each disk being offset e.g. through one-fourth or one-eighth of a turn relative to its neighbor.

In the invention, it is also preferable for the disks of the various gangs to have different numbers of lobes or of flails and/or for their helical mounting on the axes of different pairs of gangs to be performed at different pitches.

This is highly effective in avoiding the formation of a "horizon", i.e. a plane interface between earth which has been tilled and earth which has not, and this is essential for keeping the earth in a well-cultivated state.

In accordance with the invention, it can be advantageous at the ends of the gangs of disks to provide a limited number of disks which are spaced further apart from one another than the other disks of the gang. Under such circumstances, it is preferable to space apart in this way disks that correspond in the various gangs so that any one disk continues to work between the tracks of the two disks of the preceding gang of disks.

In accordance with the invention, it is also possible to place an isolated disk of larger diameter on the axis of the tilling implement behind the first group of gangs of disks, thereby providing additional work on the ground while contributing to overall stability by compensating torque tending to cause the tilling implement to pivot about a vertical axis.

In a variant, it is possible for this purpose to use a flat disk acting as a rotary colter which stabilizes and holds the tilling implement on its travel direction, or indeed a plough share.

In another embodiment of the invention, instead of providing the tilling implement with a single plurality of gangs of disks which are mounted behind one another as described above, the tilling implement has two pluralities of such gangs of disks which are disposed substantially symmetrically about the travel axis of the tilling implement in such a manner that the gangs of disks are disposed in pairs, with the pairs situated at the front of the implement when seen from above presenting a V-shape that is open towards the front of the implement while the pairs of disks situated at the rear of the implement, seen from above, present a V-shape whose tip is directed towards the front of the implement.

In this embodiment, it is advantageous for the pairs of V-shaped disk gangs that are encountered in succession on going from the front towards the rear of the tilling implement to be offset alternately to the left and to the right so that the ground is worked in satisfactory manner in the vicinity of the axis of the tilling implement.

In a variant of this embodiment, the gangs of disks in a given pair of disks are offset relative to each other in the direction of advance of the tilling implement.

This disposition makes it possible to prevent the earth situated on the tilling axis being continuously between the central ends of the two gangs of disks in the same pair.

BRIEF DESCRIPTION OF THE DRAWINGS

In order to make the invention better understood there follows a description by way of illustration and without any limiting character of various embodiments taken as examples and shown in the accompanying drawings.

In the drawings:

FIG. 4 shows a variant of the FIG. 3 embodiment;

FIGS. 5 and 6 are an elevation view and a section view of a multi-lobed tilling disk usable in the invention;

FIG. 7 is an elevation view of another tilling disk usable in the invention having multiple blades or flails.

MORE DETAILED DESCRIPTION

Figure 1:
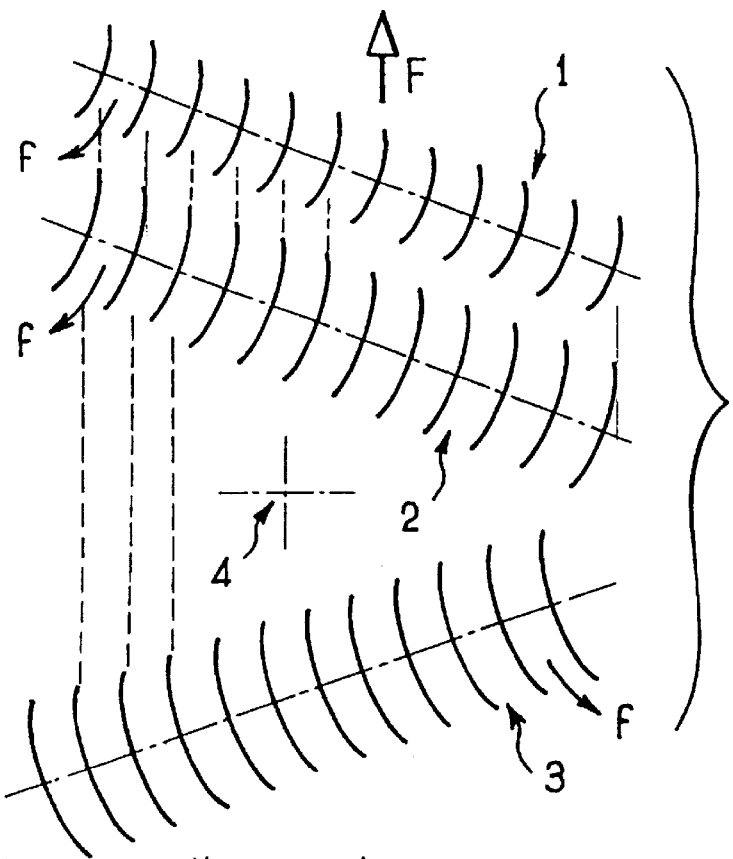
FIG. 1 is a diagrammatic plan view of a first embodiment of a tilling implement of the invention having three gangs of disks disposed on behind another together with a stabilizing rotary colter.
Figure 2:
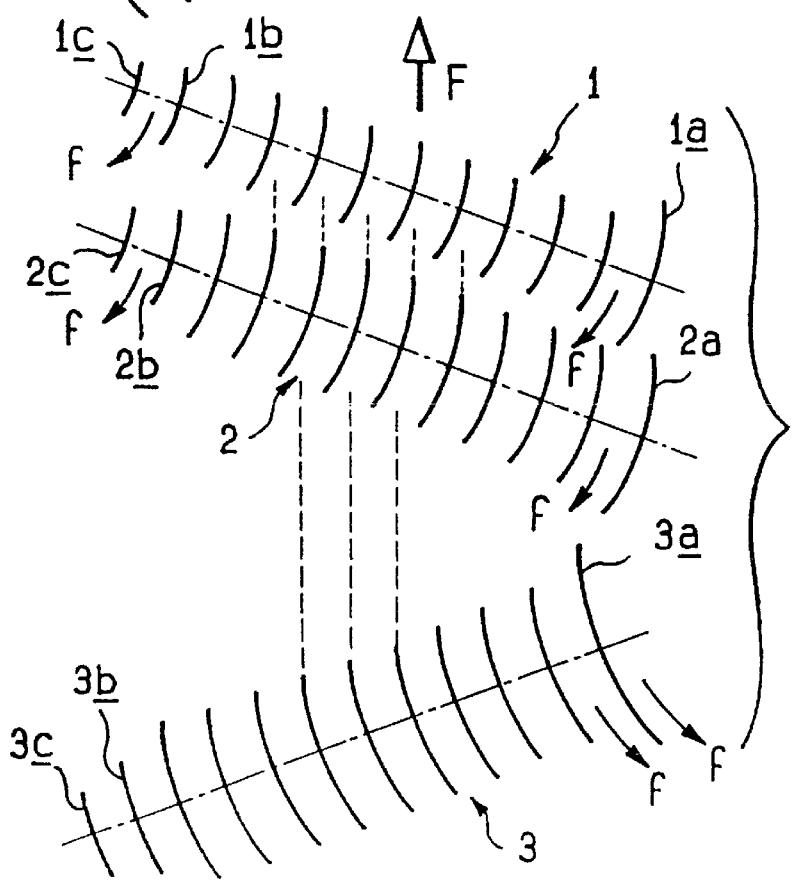
FIG. 2 is a diagrammatic plan view of a variant of the FIG. 1 embodiment.

FIGS. 1 and 2 show an embodiment of the invention in which two gangs of disks 1 and 2 are disposed in its front portion inclined relative to a perpendicular to the tilling direction and which, in conventional manner, work the earth by moving it towards the left, as represented diagrammatically by the arrows f.

In accordance with the invention, the disks of these two gangs are constituted by saucer shapes whose edges are cut out so as to present a series of lobes as shown in FIGS. 5 and 6.

In accordance with the invention, a third gang of disks 3 is placed behind these two gangs of disks, the third gang being inclined in the opposite direction and working by moving earth to the right as indicated by the arrow f.

The disks of the gang 3 can be constituted by saucers whose edges are cut out to form lobes like those shown in FIGS. 5 and 6, but they are preferably cut out to form blades or flails as shown in FIG. 7.

Figure 8:
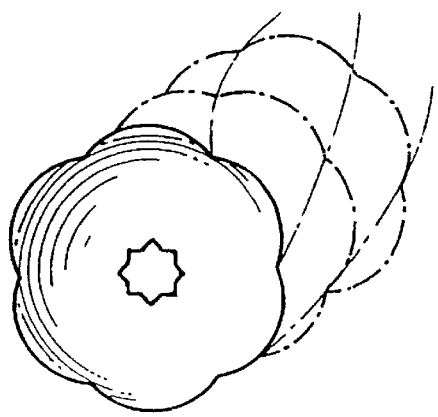
FIG. 8 is a diagrammatic perspective view showing how the disks can be fixed helically on their shaft.

In a preferred embodiment of the invention, all of the disks of a gang are constrained to rotate with the shaft that carries them, and the disks are advantageously offset relative to one another so that the various lobes or blades in a gang lie on a helix that winds around the shaft of the gang of disks, as can be seen in FIG. 8.

According to a characteristic of the invention, dashed lines in FIG. 1 show how the disks of the gang 2 are situated substantially in the middles of the tracks left by the disks of the gang 1 when seen in the tilling direction.

In accordance with the invention, the disks of the gang 3 are likewise situated substantially in the middles of the tracks left by the disks of the gang 2, as seen in the tilling direction.

In a preferred embodiment of the invention, the disks used in each gang of disks are of a diameter that is greater than the diameter of the disks in the preceding gang. Thus, the disks in the gang 1 are of smaller diameter than the disks in the gang 2 which in turn are of smaller diameter than the disks in the gang 3.

It is also advantageous for the disks of the various gangs to have different numbers of lobes and/or flails and/or for the helical pitches on which the disks are secured to their shafts to be different in the different gangs.

The axes of the gangs of disks are inclined relative to the tilling direction by an amount which is a function of the working depth of the disks.

In a particular embodiment of the invention, the gangs of disks 1 and 2 are mounted to float relative to the tilling implement, i.e. they rest on the ground under their own weight without the height position thereof being determined by the tilling implement.

However, when working flat ground, these disks can be fixed vertically relative to the frame which supports them.

It is also possible in the invention to interconnect the disks of the front gangs in a plurality of groups of disks with each group thus being capable of moving vertically independently of the others relative to the frame of the tilling implement.

In this embodiment, the front gangs of disks are made up of a plurality of small groups of disks that are independent of one another and that can move up or down relative to the frame.

In contrast, the gang of disks 3 is preferably held in a position that is fixed relative to the tilling implement so as to enable it to work the ground to a predetermined depth which is imposed thereon.

In the embodiment of FIG. 1, there is placed on the axis of the tilling implement a rotary colter 4 in the form of a disk whose bottom portion penetrates into the ground in the tilling direction so as to compensate for forces that might tend to deflect the disks as a whole to the right or to the left.

In a variant, the rotary colter 4 can be replaced by a plough share.

In the variant of FIG. 2, there can be seen the gangs of disks 1, 2, and 3 disposed in the same manner as in FIG. 1.

Unlike FIG. 1, the tilling implement of FIG. 2 does not have a rotary colter 4, but at the right-hand ends of the gangs 1, 2, and 3 it has disks 1a, 2a, and 3a having the same shape as the other disks in each of the gangs but of greater diameter. However, as shown in FIG. 2, the disks 1b, 1c, and 2b, 2c which are situated at the leading ends of the two front gangs of disks 1 and 2 are of decreasing diameters. The same applies for the disks 3b and 3c at the rear end of the rear gang of disks 3.

This avoids creating an extra thickness of earth on the left of the tilled surface.

Figure 3:
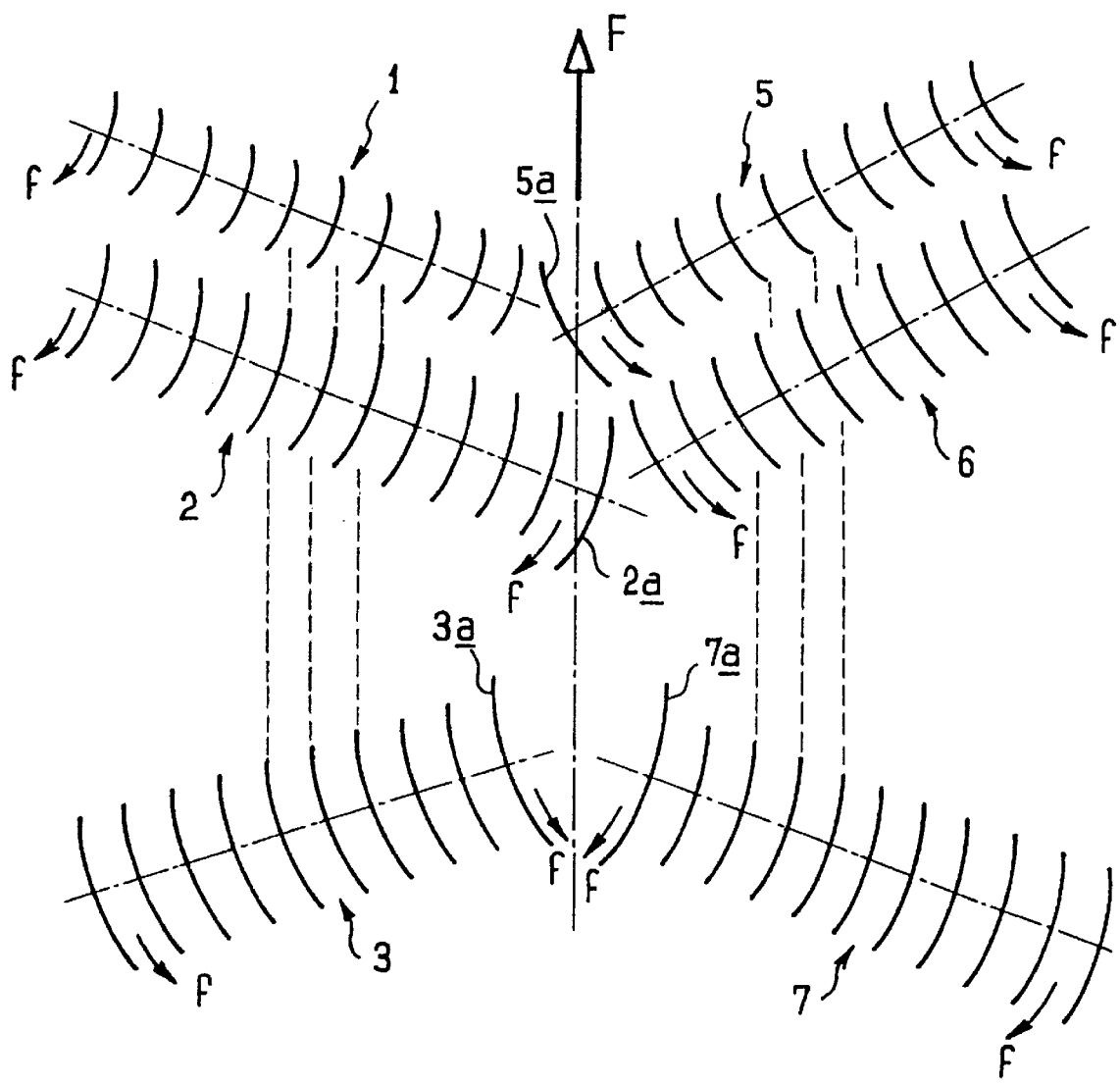
FIG. 3 is a plan view of a second embodiment of a tilling implement of the invention having three pairs of disk gangs disposed symmetrically about a tilling axis.

FIGS. 3 and 4 show a second embodiment of the invention in which the front and rear gangs of disks are disposed in pairs, a gang of disks 5 being symmetrical to the gang 1 about the tilling axis, a gang of disks 6 being symmetrical to the gang 2 about the tilling axis, and a gang of disks 7 being symmetrical to the gang 3 about the tilling axis.

In a preferred embodiment of the invention, the left-hand end of the gang of disks 5 situated at the front is situated on the left of the axis F of the tilling implement while the gang of disks 2 which is situated in the second position on the left has its right end situated to the right of the axis of the tilling implement.

In a preferred variant of this embodiment, the disks 2a and 5a of the gangs 2 and 5 which are situated in the vicinity of the axis of the tilling implement are of larger diameter than the other disks in the same gang, and are offset relative to each other so that their actions overlap.

This works the earth in the central tilled region better by moving the earth firstly to the right and then to the left as represented by the arrows f and by leaving a central furrow.

In this preferred embodiment, the two gangs of disks 3 and 7 which are situated at the rear and which are inclined in opposite directions to the inclinations of the gangs 1, 2, 5, and 6 placed at the front likewise have respective larger diameter disks 3a and 7a at their ends situated in the vicinity of the tilling axis, thereby further improving the work in the central tilling region and reclosing more effectively the central furrow dug by the gangs of disks 1, 2, 5, and 6 situated at the front, while the disks in the gangs 3 and 7 return all of the tilled earth towards the tilling center as represented by arrows f.

As described with reference to FIG. 2, the front ends of the gangs of disks 1, 5 and 2, 6 can be provided with disks of diameters that decrease relative to the other disks of said gangs.

The same applies to the rear end disks of the rear gangs of disks 3 and 7.

In the variant of the FIG. 3 embodiment that is shown in FIG. 4, the gangs of disks in each pair are offset relative to each other in the tilling direction.

FIG. 4 also shows how the disks situated at the side ends of the front gangs of disks 1, 2 and 5, 6 are provided in their concave sides with convex saucers 1d, 2d, 5d, and 6d which have the effect of reducing the capacity of these disks for performing work and thus ensuring that earth is not projected when the tilling implement is working at high speed.

FIG. 5 is an elevation view of a disk whose periphery is cut out to form rounded lobes 9, and FIG. 6 shows its section 10 in the form of a spherical cap.

In the invention, such disks are used for making up the front gangs.

FIG. 7 shows another model of disk that is likewise in the form of a spherical cap but which has large cutouts so as to be in the form of a disk having a plurality of blades or flails 11 which work the ground in a manner that is different from the disks which present lobes around their peripheries.

In the invention, such multi-blade or multi-flail disks are advantageously used for the rear gangs of the tilling implement.

The disks shown in FIGS. 5, 6, and 7 are of conventional type and they are shown here only to make it easier to understand which type of disks are used in the invention.

FIG. 8 is a diagram showing how the disks in a given gang are advantageously fixed on their shaft so as to be offset angularly with the effect of placing the lobes or flails along helical lines.

In the invention, the disks which make up the same gangs of disks situated at the front can have a diameter of 610 millimeters (mm) for example whereas the disks making up the following gang can have a diameter of 660 mm, for example, and the disks making up the rear gangs can have a diameter of 760 mm or 810 mm, for example.

By way of indication, the larger diameter disks situated at the ends of the gangs of disks can be of a diameter which is 10% to 15% greater, for example, than the diameter of the standard disks of the gang in question.

Naturally, the embodiments shown in the drawings are given purely by way of illustration and have no limiting effect on the character of the invention.

The same tilling implement of the invention can have more than two gangs or pairs of gangs of disks disposed one behind the other, it being understood that a disk must always lie substantially in the middle of the tracks left by two disks in the gang preceding it.

What is claimed is:

1. A tilling implement having a front and a rear comprising:
   at the front at least a first and a second gang of equidistant multi-lobed disks, said first and second gangs having axes that are parallel to each other and inclined relative to a direction perpendicular to an axis of the tilling implement, and
   at the rear at least one gang of equidistant disks whose axis is inclined relative to the axis of the tilling implement in a direction opposite to that of the front gangs, the disks of said at least one rear gang being selected from the group consisting of multi-lobed disks, multi-blade and multi-flail disks; and
   the disks of any gang different from the first gang being situated, when seen in the direction of the axis of the implement, between the disks of the preceding gang so as to pass between their tracks.

2. A tilling implement according to claim 1, wherein a diameter of the disks of any tilling gang different from the first gang is greater than the diameter of the disks of the preceding gang.

3. A tilling implement according to claim 1, wherein at least one gang of disks being situated at the front rests freely on the ground.

4. A tilling implement according to claim 1, wherein the gang of disks situated at the rear is held in a fixed position relative to the tilling implement.

5. A tilling implement according to claim 1 comprising: two sets of tilling gangs disposed substantially symmetrically about the axis of the tilling implement.

6. A tilling implement according to claim 5, wherein a central end of any gang of disks is situated in alternation on either side of the tilling axis when going from the front towards the rear along the tilling axis.

7. A tilling implement according to claim 5, wherein the two gangs in a same pair are offset from each other in the direction of advance of the tilling implement.

8. A tilling implement according to claim 1, at least some of the gangs of disks possessing at one end a disk of diameter greater than that of the other disks in the same gang.

9. A tilling implement according to claim 8, the center ends of two rear gangs of disks each comprising a respective disk of larger diameter.

10. A tilling implement according to claim 9, the center ends which carry a larger diameter disk being situated in alternation beyond the axis of the implement on going from the front towards the rear.

11. A tilling implement according to claim 1 the front ends of the front gangs of disks having disks of decreasing diameter.

12. A tilling implement according to claim 11, the rear ends of the rear gangs of disks having disks of decreasing diameter.

13. A tilling implement according to claim 11, the end disks of the gangs of disks having convex saucers in their concave sides.

14. A tilling implement according to claim 11, the disks of each gang being mounted on their shaft while being angularly offset relative to one another so as to place the lobes or the flails on helices.

15. A tilling implement according to claim 14, the helices of the various gangs of disks being at different pitches.

16. A tilling implement according to claim 1, the disks of the various gangs having different numbers of lobes or of flails.

17. A tilling implement according to claim 1, including a stabilizer device providing stabilization against lateral movements, such as a rotary colter or a plough share.

18. A tilling implement according to claim 6, the two gangs in the same pair being offset from each other in the direction of advance of the tilling implement.

* * * * *